US012434244B2

(12) United States Patent
Remer et al.

(10) Patent No.: US 12,434,244 B2
(45) Date of Patent: Oct. 7, 2025

(54) CLOSURE DEVICES ESPECIALLY ADAPTED TO ENSURE PROPER CLOSURE OF BIOLOGICAL SPECIMEN CONTAINERS AND BIOLOGICAL SPECIMEN COLLECTION KITS INCLUDING THE SAME

(71) Applicant: LUNA LABS USA, LLC, Charlottesville, VA (US)

(72) Inventors: J. David Remer, Charlottesville, VA (US); Kelley Mitchell Virgilio, Charlottesville, VA (US); Connor McKechnie, Charlottesville, VA (US); Emily Chak, Charlottesville, VA (US)

(73) Assignee: LUNA LABS USA, LLC, Charlottesville, VA (US)

( * ) Notice: Subject to any disclaimer, the term of this patent is extended or adjusted under 35 U.S.C. 154(b) by 48 days.

(21) Appl. No.: 18/452,347

(22) Filed: Aug. 18, 2023

(65) Prior Publication Data

US 2025/0058321 A1 Feb. 20, 2025

(51) Int. Cl.

*B01L 3/00* (2006.01)
*B65D 50/04* (2006.01)
*B65D 55/02* (2006.01)

(52) U.S. Cl.

CPC ............ *B01L 3/508* (2013.01); *B65D 50/041* (2013.01); *B65D 55/028* (2013.01); *B65D 2215/00* (2013.01)

(58) Field of Classification Search

CPC .. B65D 50/061; B65D 50/046; B65D 50/041; B65D 55/028; B65D 50/04

(Continued)

(56) References Cited

U.S. PATENT DOCUMENTS 4,037,747 A * 7/1977 Acton .................. B65D 50/041 215/219
4,365,722 A 12/1982 Kramer
(Continued)

OTHER PUBLICATIONS

International Search Report and Written Opinion (ISR/WO), PCT Application No. PCT/US2024/042538, Jan. 3, 2025.

*Primary Examiner* — Orlando E Aviles
*Assistant Examiner* — Sanjidul Islam
(74) *Attorney, Agent, or Firm* — NIXON & VANDERHYE P.C.

(57) ABSTRACT

Closure devices and kits allow closure of an open-ended container and provide a visible indication of closure torque. The closure device will include an outer cap defining a torque indicator window, an inner cap nested within the outer cap and a torque indicator disc positionally fixed to an upper surface of the inner cap and having at least two different indicia regions angularly adjacent to one another. The outer and inner caps are in mechanical interference fit with one another such that turning movement applied to the closure device allows the outer and inner caps to be turned as a unit and threadably coupled onto a threaded container until the inner cap is frictionally engaged with an edge of the container. Thereafter, continued turning movement of the outer cap relative to the inner cap causes angular displacement of the indicator window relative to the torque indicator to thereby provide a visible indication through the indicator window of an indicia region indicative of sufficient closure torque.

18 Claims, 4 Drawing Sheets

(58) Field of Classification Search
USPC ................. 215/200–204, 206, 214, 217, 230
See application file for complete search history.

(56) References Cited

U.S. PATENT DOCUMENTS

| | | | | |
|---|---|---|---|---|
| 5,115,929 | A * | 5/1992 | Buono ................. | B65D 50/041 215/230 |
| 5,184,739 | A | 2/1993 | Kusz | |
| 2002/0113032 | A1* | 8/2002 | Blomdahl ............ | B65D 51/245 215/303 |
| 2004/0195197 | A1 | 10/2004 | Miceli et al. | |
| 2012/0138561 | A1* | 6/2012 | Brozell ................ | B65D 50/041 215/220 |

* cited by examiner

CLOSURE DEVICES ESPECIALLY ADAPTED TO ENSURE PROPER CLOSURE OF BIOLOGICAL SPECIMEN CONTAINERS AND BIOLOGICAL SPECIMEN COLLECTION KITS INCLUDING THE SAME

GOVERNMENT RIGHTS

The disclosed embodiments were made with support by the Centers for Disease Control and Prevention (CDC) under Contract Nos. 75D30121P11823 and 75D30122C15216. The Government may have certain rights in the invention.

FIELD

The embodiments disclosed herein relate generally to closure devices for containers. In especially preferred forms, the embodiments disclosed herein relate to closure devices for reliably closing biological specimen containers.

BACKGROUND

Biological specimen containers are critical components of modern healthcare infrastructure. Although specimen containers are relatively low-cost and expendable, they must nonetheless be depended on by health care professionals to reliably transport a wide range of biological specimens, including high-risk samples that may be pathogenic or irreplaceable.

The importance of container integrity is further emphasized due to potential costs associated with containment failure. These costs may be compounded if leakage leads to sample contamination, which may result in false test results or cross-contamination, rendering additional samples useless. Another potential cost of specimen leakage is personnel exposure. As some samples contain noxious or pathogenic contents, there is an increased risk of harm to personnel handling compromised samples.

Multiple reasons exist for these specimen containment failures, though the primary identified failure triggers include human factors and environmental elements. The most significant containment failure is likely due to improper container closure by individuals. This factor was exacerbated in the COVID-19 crisis due to a large number of quickly-trained testing staff who may not apply the correct lid closure torque. The process is difficult even for experienced staff who may have to hold the specimen container, secondary-containment bag, container label, and swab while also performing the nasopharyngeal swab.

Improper lid placement or closure at this stage can cause a failure on its own, or it can be enhanced by environmental conditions during sample transport. Changes in temperature or air pressure (as experienced during ground or air transport) leads to a pressure differential between the container interior and the atmosphere. While the IATA Dangerous Goods Regulations, Packing Instruction 650 requires biological specimen containers to withstand a pressure differential of 95 kPa, improper lid closure can greatly reduce this capability and even result in failure of the specimen container.

In most biospecimen collection clinics, collection containers are sealed using a plastic-on-plastic wiper seal. These collection cups are notorious for leaking and are susceptible to cross threading. Furthermore, there is little regard in these designs for individuals who may lack the wrist strength necessary to properly close these containers. An improperly sealed container poses many issues not just for the patient, but also for the lab technicians who aliquot samples from the biospecimen collection. If the container leaks too much, the lab technician will be unable to collect an adequate amount of biospecimen. The patient will have to return to the clinic and provide another sample. Additional risk to clinical staff is posed by leakage of potentially hazardous materials.

There thus exists a need for a low-cost, positive feedback, closure solution with an integrated, leak-proof gasket for biospecimen collection. It is towards providing such a need that the embodiments disclosed herein are directed.

SUMMARY

Broadly, the embodiments disclosed herein relate to closure devices which allow closure of an open-ended container and provide a multisensory (visual, audible and tactile) indication of closure torque. In preferred embodiments, the closure device will include an outer cap defining a torque indicator window, an inner cap nested within the outer cap and a torque indicator disc positionally fixed to an upper surface of the inner cap and having an indicia region indicative of sufficient closure torque. The upper surface of the inner cap may, for example, include an annular recess in which the torque indicator disc is positionally fixed.

The outer and inner caps are in mechanical interference fit with one another such that turning movement applied to the closure device allows the outer and inner caps to be turned as a unit and threadably coupled onto a threaded container until the inner cap is frictionally engaged with an upper edge of the container. Thereafter, continued turning movement of the outer cap relative to the inner cap causes angular displacement of the indicator window relative to the torque indicator disc to thereby provide a visible indication through the indicator window of the indicia region indicative of sufficient closure torque.

According to some embodiments, the outer cap includes a series of pawl elements circumferentially spaced apart around an inner surface thereof while the inner cap includes a series of ratchet teeth circumferentially spaced apart around an outer surface thereof that are in mechanical interference fit with the pawl elements. The pawl elements may therefore be sized and configured to have a predetermined radial dimension and/or vertical height which establishes the sufficient closure torque. The pawl elements will therefore be capable of sliding over the ratchet teeth upon reaching the sufficient closure torque to thereby generate an audible clicking sound and tactile sensation which together with the visible torque indicator further provides enhanced sensory signals of adequate container closure.

By way of example, the first and second indicia regions of the torque indicator disc may include different visible perceptible indicia selected from the group consisting of different markings, symbols, emojis, images, colors and combinations thereof. For example, the first and second indicia regions may comprise different adjacent color region pairs of adjacent red and green angular color regions or adjacent black and white angular color regions. Virtually any combinations of different indicia are of course envisioned and suitably employed in the practice of this invention.

The closure device may comprise an annular sealing gasket positioned on an interior surface of the inner cap. According to certain embodiments, the sealing gasket is over-molded onto the interior surface of the inner cap so as to be engageable with the upper edge of the open-ended container thereby forming a fluid tight seal.

These and other aspects of the present invention will become more clear after careful consideration is given to the following detailed description of a presently preferred exemplary embodiment thereof.

BRIEF DESCRIPTION OF THE DRAWINGS

Reference will be made to the accompanying drawing Figures, wherein.

DETAILED DESCRIPTION

Accompanying FIGS. 1-4 show a specimen collection kit CK in accordance with an embodiment of the present invention which is comprised generally of a specimen container 10 and a closure device 20 threadably connected to the specimen container 10. The specimen container 10 is in and of itself conventional and is comprised of an open-ended container of sufficient size and volume so as to receive and contain the desired amount of collected biological material. In order to aid in the proper amount of specimen collection, the exterior surface of the container 10 may be provided with graduated volume markings 10*a* in both metric and Imperial volume units.

Figure 1:
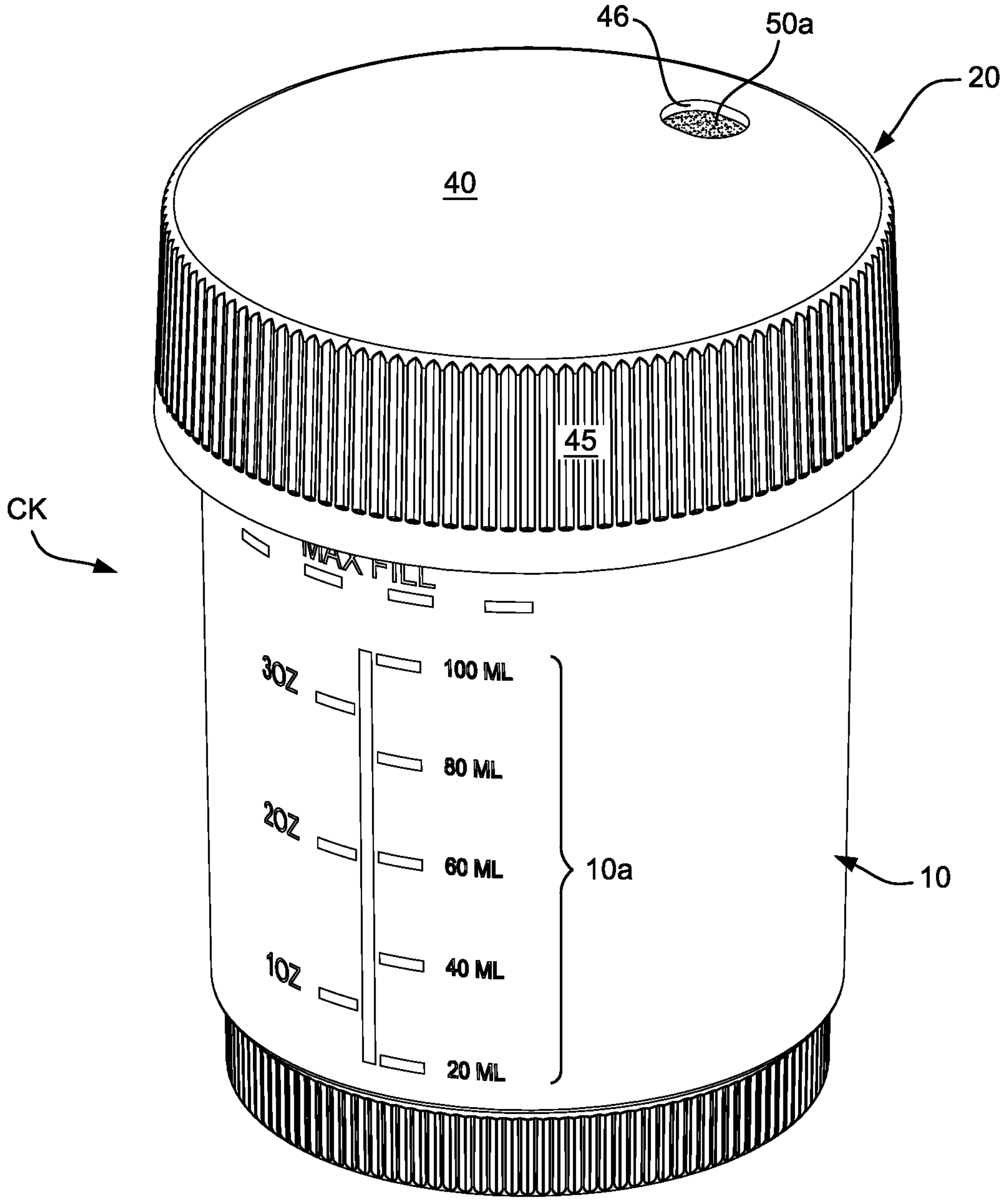
FIG. 1 is a perspective view of an exemplary closure device operatively associated with a biological specimen collection container.
Figure 2:
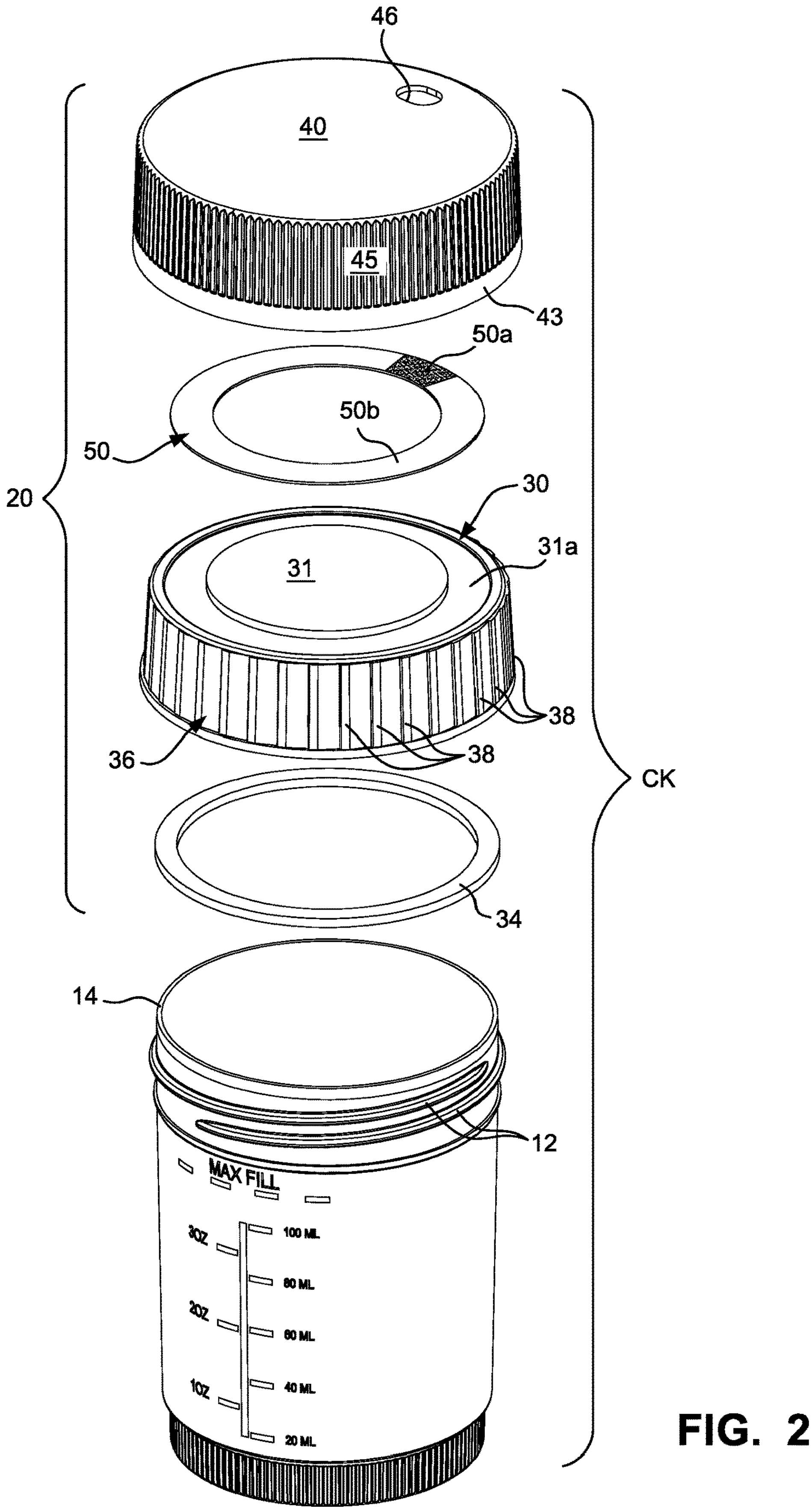
FIG. 2 is an exploded top perspective view of the closure device components in accordance with the embodiment depicted in FIG. 1.
Figure 3:
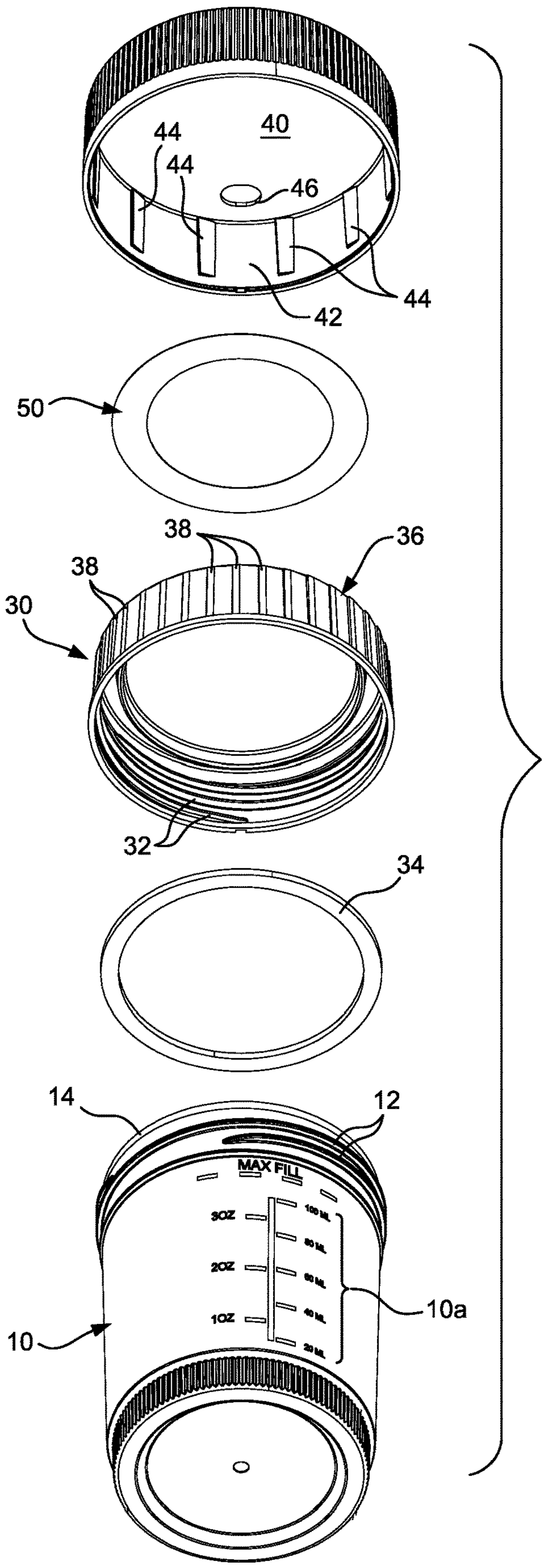
FIG. 3 is an exploded bottom perspective view of the closure device components depicted in FIG. 1.
Figure 4:
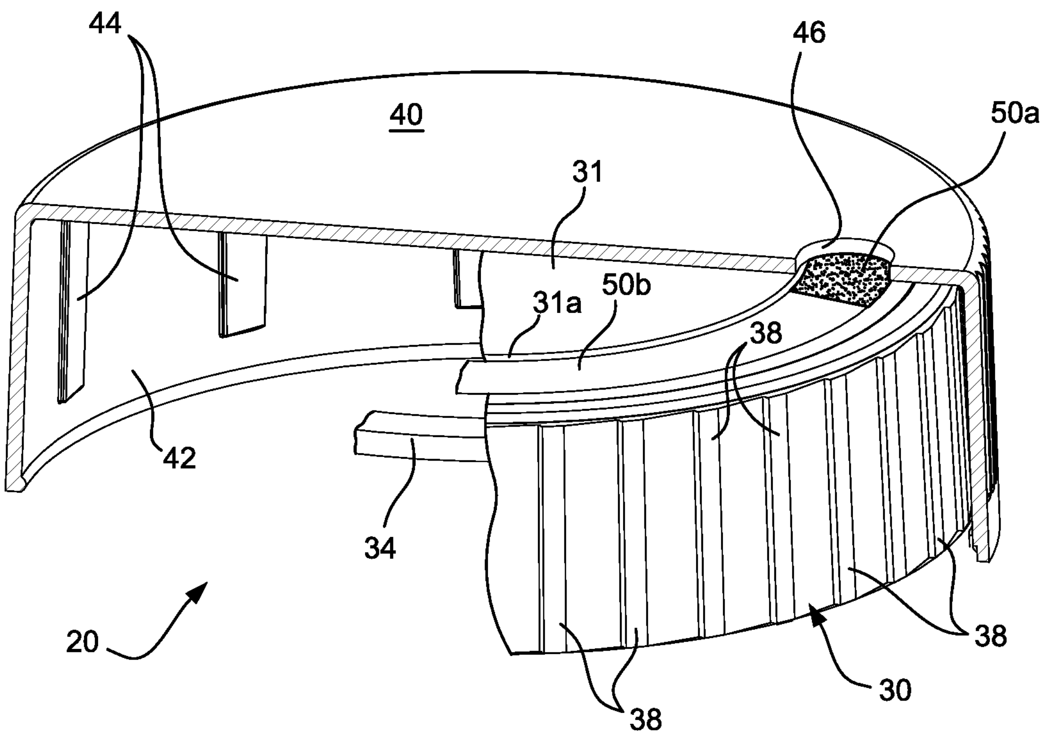
FIG. 4 is a partial cross-sectional perspective view of the closure device.

The upper exterior surface region of the open-ended container 10 is provided with conventional right-hand external threads 12 that cooperate with the right-hand internal threads 32 of the inner cap 30 to thereby allow the latter to be threadably connected to the former in response to a clockwise turning movement (see FIG. 3). An annular pressure-sensitive gasket 34 formed of a suitable elastomeric material inert to the biological specimen is received within the inner cap 30 so as to contact the upper edge 14 defining the upper open end of the container 10 and establish a liquid-tight seal when the closure device 20 has been threadably tightened onto the container 10 with sufficient torque. The gasket 34 may be a separate component which is fixed (e.g., via adhesive) to the inner cap 30 or may be overmolded with the inner cap 30 during production.

The outer surface 36 of the inner cap 30 is provided with a circumferentially spaced apart series of ratchet teeth (a representative few of which are identified as reference 38) which operatively cooperate with pawl elements (a representative few of which are identified as reference 44) which are circumferentially spaced-apart along an inner surface 42 of the outer cap 40. The outer surface 43 of the outer cap 40 may also be provided with vertical serrations 45 so as to facilitate a user's grip on the cap 40 during turning movements applied to the closure device 20.

The radial dimension that the pawl elements 44 extend outwardly from the inner surface 42 of the outer cap 40 towards the outer surface 36 of the inner cap 30 will thereby establish the amount of torque a user must apply to the outer and inner caps 30, 40 in order to form a fluid-tight seal between the upper edge 14 of the container 10 and the gasket 34 carried by the inner cap 30. Thus, the greater the radial dimension of the pawl elements 44, the greater the torque is needed to establish the fluid-tight seal and vice versa. Thus, the amount of torque necessary to effect a fluid-tight seal can be preselected in dependence upon the type of specimen container that is employed and the type of biological specimen intended to be collected.

The inner cap 30 is press-fit in a nested relationship within the outer cap 40 so that the ratchet teeth 38 and pawl elements 44 are in mechanical interference with one another. Thus, the inner and outer caps 30, 40, respectively, may be turned as a complete unit during threaded engagement between the external and internal threads 12, 32 of the container 10 and the inner cap 30, respectively, in response to clockwise turning movement applied to the closure device 20. A friction force will thus ultimately be encountered when the upper edge 14 engages the gasket 34. Such a friction force will thereby substantially arrest continued turning movement of the inner cap 30 relative to the container 10. The outer cap 40 however is capable of continued clockwise turning movement with additional applied torque due to the mechanical interference between the pawls 44 thereof and the correspondingly adjacent ratchet teeth 38.

Depending on the radial dimension of the pawls 44, an additional amount of torque applied to the outer cap 40 will in turn be transmitted to the inner cap 30 allowing additional tightening of the latter relative to the upper edge 14 of the container 10 which in turn increases the frictional engagement between the upper edge 14 of the container 10 and the gasket 34. When the frictional force engagement between the upper edge 14 of the container 10 and the gasket 34 reaches a desired pre-determined amount to achieve a fluid-tight seal therebetween, any further applied torque to the outer cap 30 will thereby cause the pawls 44 to slip past the ratchet teeth 38 resulting in an audible clicking sound indicative that the proper torque has been applied.

A torque indicator disc 50 is positionally fixed to an upper surface 31 of the inner cap 30, e.g., within an annular recess 31*a* formed in the inner cap 30. The torque indicator disc 50 most preferably comprises at least two angularly adjacent regions 50*a*, 50*b* of visibly perceptible indicia, such as different markings, symbols, emojis, images and/or colors (including white and black), that respectively indicate insufficient closing torque and sufficient closing torque, respectively, applied to the closure device 20 when coupled to the container 10.

The outer cap 40 is provided with an indicator window 46 through which a subjacent portion of the torque indicator disc 50 is visibly apparent. Thus, when the closure device 20 is initially threaded onto the container 10, the indicator window 46 will be aligned with a first indicia region 50*a* which is indicative of insufficient closure torque. However, upon reaching the maximum predetermined torque to achieve proper sealing between the edge 12 of the container 10 and the gasket 34, the outer cap 40 will continue to be turned relative to the inner cap 30 as described previously. Such continued turning movement of the outer cap 40 will therefore angularly move the associated torque indicator window 46 relative to the positionally fixed torque indicator disc 50 until such time that the second indicia region 50*b* associated with the indicator disc 50 is visibly apparent. At this time, the user will be provided with a visual indication that sufficient torque has been applied to the closure device 20 in order to achieve proper fluid tight sealing with the container 10. Thus, the audible clicking sound and the visible indication provided by the visible registry of the indicator window 46 and the second indicia region 50*b* of the closure device 20 will assist in preventing over-torquing which could in turn lead to container seal failure.

In certain embodiments, the torque indicator window 46 may be provided with angular adjacent regions of different color. For example one region may be colored red (or white) as an indication of insufficient closing torque being applied to the closure device 20 while a second adjacent region may be colored green (or black) as an indication of sufficient closing torque having been applied to the closure device 20. Suffice it to say that any combination of different markings, symbols, emojis, images and/or colors (including white and black) may be employed so as to convey a visual indication of insufficient and sufficient closure torque being applied to the closure device 20.

In order to remove the closure device 20 from the container 10, a user need only apply counterclockwise turning movement to the outer cap 40 which in turn causes the pawls 44 to engage the ratchet teeth 38 of the inner cap 30 and thereby allow the inner and outer caps 30, 40, respectively, to be turned counterclockwise as a unit. Such counterclockwise turning movement will therefore cause the threads 12 of the container 10 and the threads 32 of the inner cap 30 to be threadably disengaged from one another to an extent that the closure device 20 may then be removed from the container 10.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A closure device to allow closure of an open-ended container and provide a visible indication of closure torque, the closure device comprising:

an outer cap defining a torque indicator window, the outer cap including a series of pawl elements circumferentially spaced apart around an inner surface thereof;

an inner cap nested within the outer cap, the inner cap including a series of ratchet teeth circumferentially spaced apart around an outer surface thereof; and a torque indicator disc positionally fixed to an upper surface of the inner cap and having an indicia region indicative of sufficient closure torque, wherein the pawl elements of the outer cap and the ratchet teeth of the inner cap are in mechanical interference fit with one another such that turning movement applied to the outer cap of the closure device in a clockwise direction allows the outer and inner caps to be turned as a unit and be threadably coupled onto a threaded container until the inner cap is frictionally engaged with an edge of the container, and wherein the pawl elements of the outer cap have a predetermined radial dimension which establishes the sufficient closure torque such that the pawl elements slide over the ratchet teeth upon reaching the sufficient closure torque when the inner cap is frictionally engaged with the edge of the container to thereby generate an audible clicking sound upon continued clockwise turning movement of the outer cap relative to the inner cap which responsively causes angular displacement of the torque indicator window relative to the torque indicator disc and expose the indicia region thereof to thereby provide a visible indication through the torque indicator window that the sufficient closure torque has been attained.

2. The closure device according to claim 1, wherein the torque indicator disc includes first and second angularly adjacent indica regions, and wherein the continued turning movement of the outer cap relative to the inner cap causes angular displacement of the indicator window so as to change the visual indication from a first one of the indicia regions indicative of insufficient closure torque to a second one of the indicia regions indicative of sufficient closure torque.

3. The closure device according to claim 1, wherein the closure device comprises an annular sealing gasket positioned on an interior surface of the inner cap.

4. The closure device according to claim 3, wherein the sealing gasket is over-molded onto the interior surface of the inner cap.

5. The closure device according to claim 2, wherein the first and second indicia regions of the torque indicator disc respectively include different visible perceptible indicia selected from the group consisting of different markings, symbols, emojis, images, colors and combinations thereof.

6. The closure device according to claim 5, wherein the first and second indicia regions comprise different adjacent color region pairs of adjacent red and green color regions or adjacent black and white color regions.

7. The closure device according to claim 1, wherein the upper surface of the inner cap includes an annular recess, and wherein the torque indicator disc is positionally fixed within the annular recess.

8. A specimen collection method comprising the steps of:

(a) collecting a specimen within a threaded open ended container; and (b) closing the open-ended container by threadably coupling the closure device according to claim 1 to the container until an indication of sufficient closure torque is visible through the torque indicator window thereof.

9. The method according to claim 8, wherein the specimen is a biological specimen.

10. A specimen collection kit comprising:

an open-ended threaded container, and the closure device according to claim 1.

11. The specimen collection kit according to claim 10, wherein the closure device comprises an annular sealing gasket positioned on an interior surface of the inner cap.

12. The specimen collection kit according to claim 11, wherein the sealing gasket is over-molded onto the interior surface of the inner cap.

13. The specimen collection kit according to claim 10, wherein the torque indicator disc comprises first and second indicia regions which respectively include different visible perceptible indicia selected from the group consisting of different markings, symbols, emojis, images, colors and combinations thereof.

14. The specimen collection kit according to claim 13, wherein the first and second indicia regions comprise different adjacent color region pairs of adjacent red and green color regions or adjacent black and white color regions.

15. The specimen collection kit according to claim 10, wherein the upper surface of the inner cap includes an annular recess, and wherein the torque indicator disc is positionally fixed within the annular recess.

16. The specimen collection kit according to claim 15, wherein the torque indicator disc comprises first and second indicia regions which respectively include different visible perceptible indicia selected from the group consisting of different markings, symbols, emojis, images, colors and combinations thereof.

17. The specimen collection kit according to claim 16, wherein the first and second indicia regions comprise different adjacent color regions.

18. The specimen collection kit according to claim 17, wherein the different adjacent color regions comprise adjacent red and green color regions or adjacent black and white color regions.

* * * * *